March 24, 1925.
W. THOMSON
PIPE WRENCH
Filed Dec. 28, 1923
1,531,050
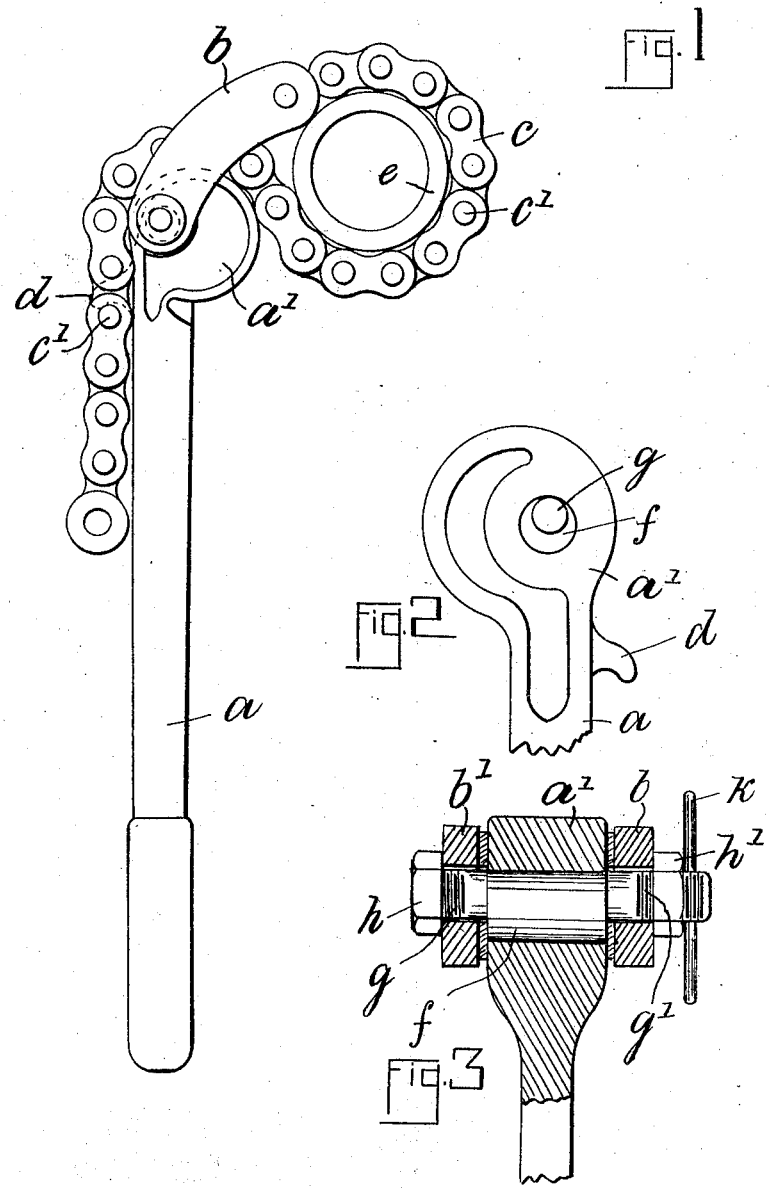

Patented Mar. 24, 1925.

1,531,050

UNITED STATES PATENT OFFICE.

WALTER THOMSON, OF POULTON-LE-FYLDE, ENGLAND.

PIPE WRENCH.

Application filed December 28, 1923. Serial No. 683,182.

*To all whom it may concern:*

Be it known that I, WALTER THOMSON, a subject of the King of Great Britain, and resident of Spring Vale, Bispham Road, Carleton, Poulton-le-Fylde, in the county of Lancaster, England, have invented certain new and useful Improvements in Pipe Wrenches, of which the following description, having reference to the accompanying sheet of drawings, is a specification.

My invention relates to pipe wrenches of the type wherein a lever has pivoted upon it two similar spaced apart links to which is pivoted one end of a chain whilst the other end of the chain after it has been made to encircle the pipe is made to pass between the links and to engage with a projection on said lever, the gripping actions being effected by a cam at the end of the said lever. It has been found in this type of wrench especially with the smaller sizes that very often the projection on the said lever does not conveniently engage with the chain owing to the diameter of the pipe to be gripped not being such as to cause an opening in the chain to be presented to the said projection. To overcome this disadvantage is the object of my invention and I attain this object by the employment of an eccentric pin by which the said links are pivoted to the lever. In the accompanying sheet of drawings which is illustrative of my invention:—

Fig. 1 is a side elevation of the pipe wrench made in accordance with my invention.

Fig. 2 is a side elevation of sufficient of the lever which I employ to show an end view of the eccentric pin.

Fig. 3 is a sectional rear elevation of the lever and links pivoted thereto.

In carrying my invention into effect I make use of a lever $a$ having a cam surface $a^1$ formed on the head thereof. Pivoted to this lever are two links $b$ and $b^1$ to the end of which is pivoted one end of a chain $c$. On the lever $a$ is formed a projection $d$ which engages as shown by Fig. 1 with the studs $c^1$ in the chain $c$ when desired so that in order to grip the pipe $e$ the chain $c$ is passed round the pipe then upwards through the links $b$ and the chain is then taken downwards to cause the projection $d$ to pass between two of the studs $c^1$ as shown by Fig. 1. Very often by this simple procedure the studs $c^1$ are not brought into such a position that the projection $d$ will pass readily between same and in order that this fault may be overcome I make use of a pin $f$ which has eccentric projections $g$, $g^1$ as shown by Fig. 3. This pin $f$ passes through the head of the lever $a$ and its projections $g$ and $g^1$ are provided with screw threads so that, after the links $b$ and $b^1$ have been placed over same, nuts $h$ and $h^1$ may be screwed into a position to hold the links securely. By turning the pin $g$ the adjustment of the chain $c$ can be sufficiently effected to cause the studs $c^1$ to come into the desired position in engagement with the projection $d$. In order that the turning of the pin $g$ may be easily accomplished I provided a handle $k$ which preferably consists of a rod inserted through an opening within the end of the stud $g^1$ as shown by Fig. 3.

Such being the nature and object of my said invention, what I claim is:—

1. In a pipe wrench, a lever, a cam head formed on said lever, an eccentric pin in said head, two spaced apart links pivoted on said pin, a chain pivoted at one end to said links, and a projection on said lever to engage in said chain.

2. In a pipe wrench, a lever, a cam head formed on said lever, an eccentric pin in said head, two spaced apart links pivoted on said pin, a chain pivoted at one end to said links, a projection on said lever to engage in said chain, and a handle fixed to said eccentric pin.

In testimony whereof I have signed my name to this specification in the presence of two subscribing witnesses.

WALTER THOMSON.

Witnesses:
 ERNEST HEY,
 M. OPENSHAW.